US012085273B1

(12) United States Patent
Liang

(10) Patent No.: US 12,085,273 B1
(45) Date of Patent: Sep. 10, 2024

(54) LIGHT SOURCE DEVICE AND LIGHT STRING

(71) Applicant: Nanning Wang Choi Lighting Technology Co., Ltd., Nanning (CN)

(72) Inventor: Faquan Liang, Nanning (CN)

(73) Assignee: Nanning Wang Choi Lighting Technology Co., Ltd., Nanning (CN)

( * ) Notice: Subject to any disclaimer, the term of this patent is extended or adjusted under 35 U.S.C. 154(b) by 0 days.

(21) Appl. No.: 18/525,897

(22) Filed: Dec. 1, 2023

(30) Foreign Application Priority Data

Nov. 21, 2023 (CN) ......................... 202323148483.3

(51) Int. Cl.
*F21V 5/00* (2018.01)
*F21S 4/00* (2016.01)
*F21V 31/00* (2006.01)

(52) U.S. Cl.
CPC .................. *F21V 5/00* (2013.01); *F21S 4/00* (2013.01); *F21V 31/005* (2013.01)

(58) Field of Classification Search
CPC ............. F21V 5/00; F21V 31/005; F21S 4/00
See application file for complete search history.

(56) References Cited

U.S. PATENT DOCUMENTS 10,502,874 B1 * 12/2019 Loomis .............. G02B 19/0028
10,948,174 B1 * 3/2021 Zhang ................... F21V 23/001
11,543,085 B1 * 1/2023 Lei .......................... F21K 9/232
11,644,160 B1 * 5/2023 Xu ........................ F21V 31/005 362/217.14
2004/0004435 A1 * 1/2004 Hsu ........................ H10K 50/87 257/E23.095
2007/0153531 A1 * 7/2007 Lin ..................... F21V 19/0005 362/362
2008/0143234 A1 * 6/2008 Yu ........................... F21V 17/06 313/318.09
2016/0010814 A1 * 1/2016 Peng ..................... F21V 31/005 362/244
2022/0026040 A1 * 1/2022 Lin ......................... F21K 9/232
2023/0151934 A1 * 5/2023 Lei .......................... F21K 9/238 362/217.14

* cited by examiner

*Primary Examiner* — Tsion Tumebo

(57) ABSTRACT

The present application discloses a light source device and a light string. The light source device comprises a transparent protective cover, an LED module and a refraction lens, and the transparent protective cover has an accommodating cavity with an opening at one end; the LED module is arranged in the accommodating cavity, and is used for emitting light; the refraction lens is covered above the LED module, a side of the refraction lens close to the LED module is an incident surface, and a side of the refraction lens away from the LED module is an exit surface, and the exit surface is used for refracting light passing through the exit surface. According to the application, the light emitted by the LED module is refracted by the refraction lens and diffused around, thus realizing wide-area illumination. It can achieve the maximum of 360° light emission and improve the decorative effect.

5 Claims, 3 Drawing Sheets

LIGHT SOURCE DEVICE AND LIGHT STRING

CROSS REFERENCE TO RELATED APPLICATIONS

The present application claims the benefit of Chinese Patent Application No. 202323148483.3 filed on Nov. 21, 2023, the contents of which are incorporated herein by reference in their entirety.

TECHNICAL FIELD

The present application relates to the field of lighting equipment, in particular to a light source device and a light string.

BACKGROUND

Usually, the traditional incandescent lamp technology mainly uses tungsten filament as wick, and the tungsten filament is heated and emits light when electrified. This kind of lamp bead has short life, low light efficiency and high energy consumption. In order to solve the above problems, LED chip is adopted as a light emitting device in the prior art. However, the light emitted by LED chip is concentrated, which makes the decorative effect not good when it is applied to decorative light strings.

SUMMARY

The embodiments of the present application provide a light source device and a light string, aiming at solving the problems of short service life, high energy consumption and poor decorative effect of incandescent light strings.

Specifically, the present application provides a light source device, which includes a transparent protective cover, an LED module and a refraction lens, and the transparent protective cover has an accommodating cavity with an opening at one end; the LED module is arranged in the accommodating cavity, and is used for emitting light; the refraction lens is covered above the LED module, a side of the refraction lens close to the LED module is an incident surface, and a side of the refraction lens away from the LED module is an exit surface, and the exit surface is used for refracting light passing through the exit surface.

Optionally, the exit surface consists of at least one cambered surface; or the exit surface consists of at least one cambered surface and at least one plane connected in sequence.

Optionally, the LED module includes an LED chip, a first conducting pillar and a second conducting pillar, the first conducting pillar and the second conducting pillar are arranged at intervals; and the LED chip is electrically connected with the first conducting pillar and the second conducting pillar.

Optionally, the first conducting pillar and/or the second conducting pillar include a connecting part and a conducting part, the connecting part and the conducting part are connected in sequence; the connecting part is positioned in the transparent protective cover, and the conducting part extends out of the transparent protective cover; an end of the connecting part away from the conducting part is provided with a stage; and the LED chip is bonded on the stage.

Optionally, the LED chip is provided with an input electrode and an output electrode; the LED chip is adhered to the stage by an insulating adhesive, and the input electrode is electrically connected with the first conducting pillar by a wire; and the output electrode is electrically connected with the second conducting pillar by the wire.

Optionally, the LED chip is provided with an input electrode and an output electrode; the input electrode is adhered to the stage of the first conducting pillar by a conductive adhesive, and the output electrode is adhered to the stage of the second conducting pillar by the conductive adhesive.

Optionally, the light source device further includes a sealing plug for sealing and blocking the opening of the transparent protective cover; and the first conducting pillar and the second conducting pillar are embedded in and pass through the sealing plug.

Optionally, the sealing plug is formed by high-temperature sintering molding at the opening end of the transparent protective cover.

The present application also provides a light string, which includes a plurality of the light source devices described above, and the plurality of light source devices are arranged in series or in parallel, or in series and parallel.

The present application has the following beneficial effects.

According to the light source device and the light string provided by the present application, the refraction lens is covered above the LED module for refracting light passing through the exit surface, so that the light emitted by the LED module is refracted by the refraction lens and diffused around, thus realizing wide-area illumination. It can achieve the maximum of 360° light emission and improve the decorative effect. At the same time, LED module is adopted as the light-emitting device, which makes reasonable use of the advantages of long life, high light efficiency, low energy consumption and environmental protection of LED chip. Therefore, the problems of short service life, high energy consumption and poor decorative effect of incandescent lamp strings in the prior art can be taken into account.

Further, the exit surface is composed of surfaces with different shapes such as cambered surfaces and/or planes. In this way, light can refract to different angles through the refractive surface with different shapes, so that various decorative effects are obtained, and the effect are richer and better.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

Figure 1:
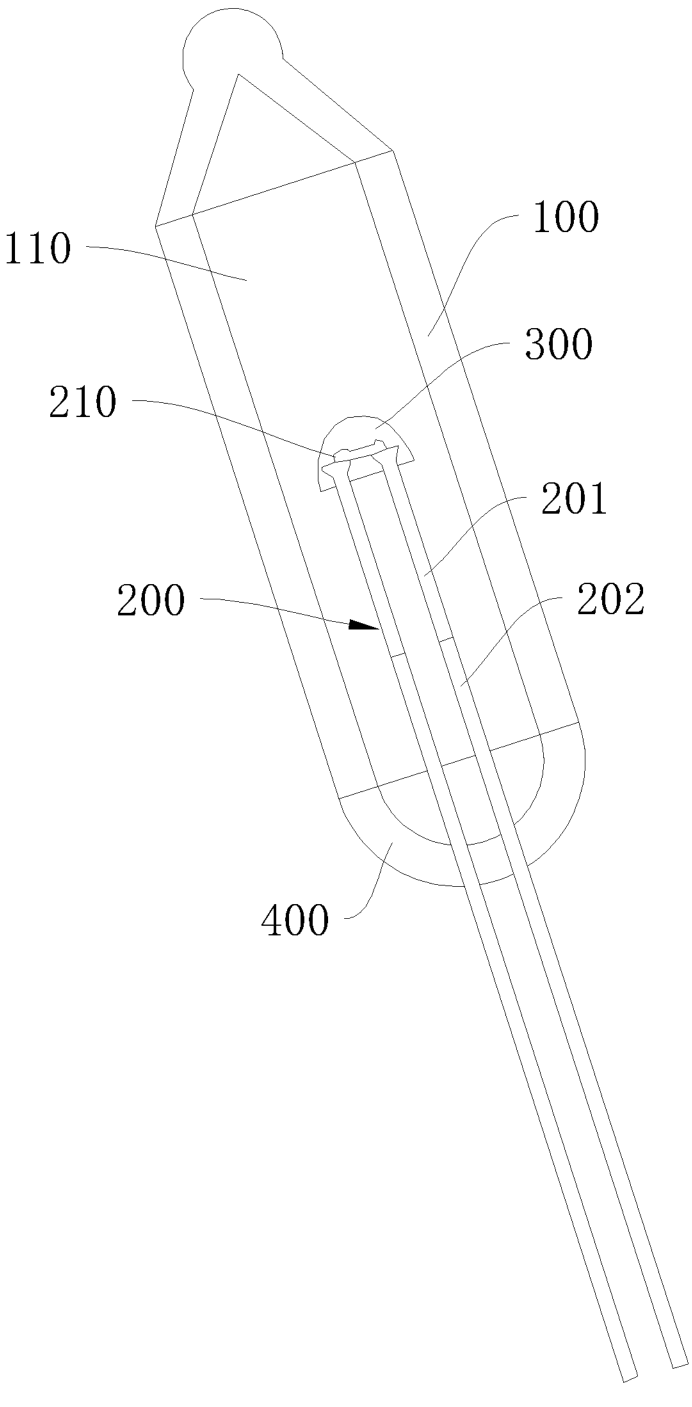
FIG. 1 is a schematic sectional view of a light source device provided by an embodiment of the present application.

Reference signs in the drawings are as follows. 100. Transparent protective cover; 110. Accommodating cavity; 200. LED module; 201. Connecting part, 202. Conducting part, 203. Stage; 210. LED chip; 211. Input electrode; 212. Output electrode; 220. First conducting pillar; 230. Second conducting pillar; 300. Refraction lens; 400. Sealing plug; 510. Conductive adhesive; 520. Insulating adhesive; 530. Wire.

DETAILED DESCRIPTION OF DISCLOSED EMBODIMENTS

In order to make the technical problems, technical solutions and beneficial effects of the present application more clear, the application will be further explained in detail below with reference to the drawings and embodiments. It should be understood that the specific embodiments described here are only used to illustrate the application, rather than to limit the application.

In the description of the present application, it is to be understood that the terms “longitudinal”, “radial”, “length”, “width”, “thickness”, “upper”, “lower”, “front”, “rear”, “left”, “right”, “vertical”, “horizontal”, “top”, “bottom”, “inner”, “outer”, and the like indicate an orientation or positional relationship based on that shown in the drawings, and are for convenience of description and simplicity of description only, not intended to indicate or imply that the indicated devices or elements must have a particular orientation, be constructed and operated in a particular orientation, and are therefore not to be construed as limiting the present application.

In the description of the present application, unless otherwise stated, “multiple” means two or more. In the description of the present application, it should be noted that unless otherwise specified and defined, the terms “installation”, “connected with” and “connected to” should be understood in a broad sense. For example, they may be fixedly connected, detachably connected or integrally connected, or may be mechanically connected or electrically connected, or may be directly connected or indirectly connected through an intermediate medium. Or it may be internal communication of two elements. For those of ordinary skill in the art, the specific meanings of the above terms in the present application may be understood in specific situations.

FIG. 1 is a schematic cross-sectional view of a light source device provided by an embodiment of the present application. As shown in FIG. 1, and referring to FIGS. 2 to 3, the light source device includes a transparent protective cover 100, an LED module 200 and a refraction lens 300, wherein the transparent protective cover 100 has an accommodating cavity 110 with an opening at one end; the LED module 200 is arranged in the accommodating cavity 110, and is used for emitting light; the refraction lens 300 is covered above the LED module 200, a side of the refraction lens 300 close to the LED module 200 is an incident surface, and a side of the refraction lens 300 away from the LED module 200 is an exit surface, and the exit surface is used for refracting light passing through the exit surface.

According to the present application, the LED module 200 is arranged behind the transparent protective cover 100, and the refraction lens 300 is covered above the LED module 200 for refracting light passing through the exit surface, so that the light emitted by the LED module 200 is refracted by the refraction lens 300 and diffused around, thus realizing wide-area illumination. It can achieve the maximum of 360° light emission and improve the decorative effect. At the same time, LED module 200 is adopted as the light-emitting device, which makes reasonable use of the advantages of long life, high light efficiency, low energy consumption and environmental protection of LED chip 210. Therefore, the problems of short service life, high energy consumption and poor decorative effect of incandescent lamp strings in the prior art can be taken into account.

In an embodiment of the present application, the exit surface is consisting of at least one cambered surface; or, the exit surface consists of at least one cambered surface and at least one plane connected in sequence. That is, at least one cambered surface and/or plane, and other surfaces with different shapes form the exit surface of the refraction lens. In this way, light can refract to different angles through the refractive surface with different shapes, so that various decorative effects are obtained, and the effect are richer and better. In this embodiment, the number of cambered surfaces and planes may be the same or different, depending on the actual needs.

In an embodiment of the present application, the refraction surface of the refraction lens is an arc surface or a plane. Further, the surface of the refraction lens 300 facing away from the LED module 200 is an exit surface, and the distance between the exit surface and the incident surface is fixed. The spherical surface has a uniform shape, and the thickness of the refraction lens 300 is uniform everywhere, thus the manufacturing process of the refraction lens 300 is simple and the production time is short, so the production efficiency can be effectively improved.

Figure 2:
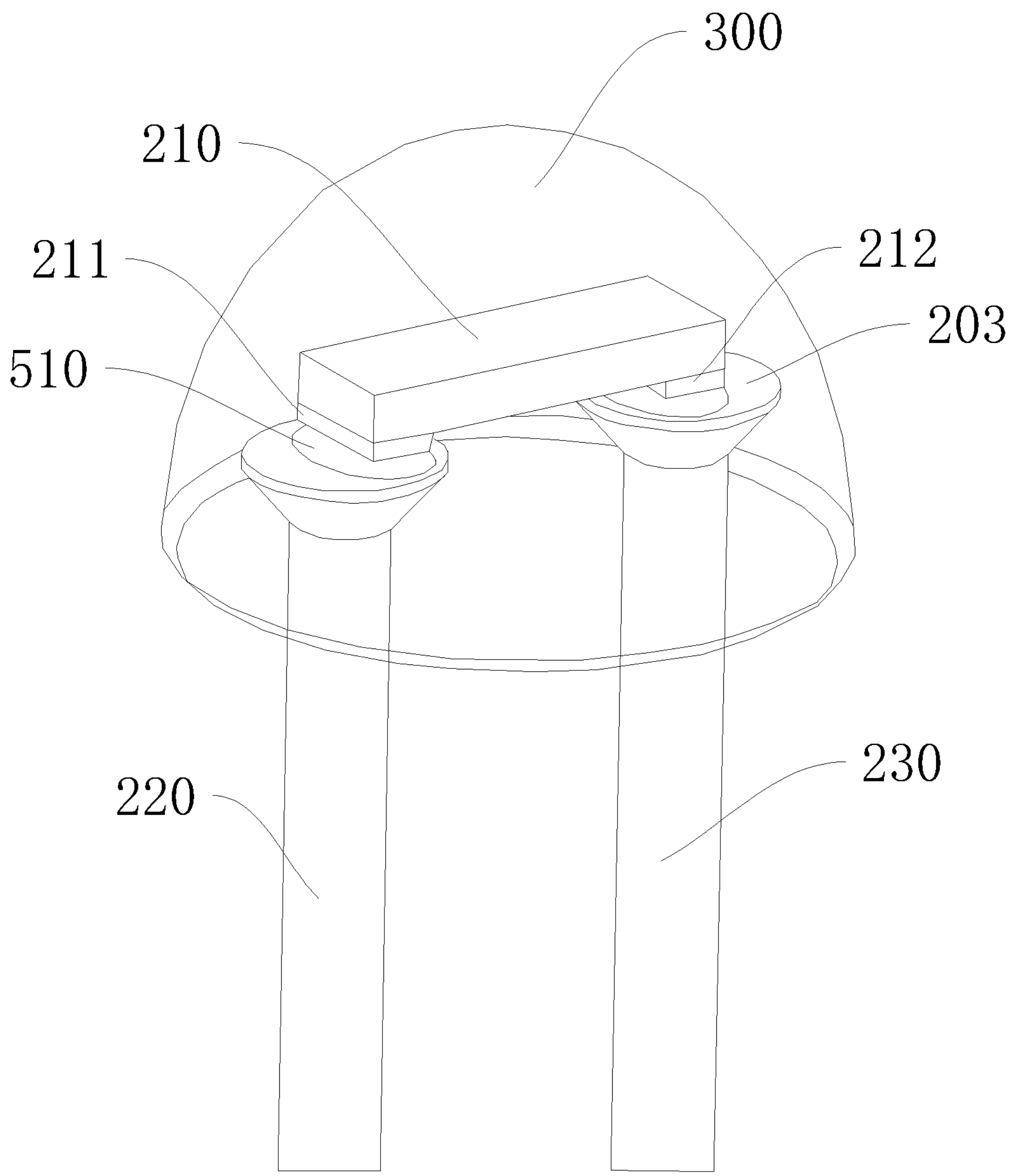
FIG. 2 is a schematic partial structural diagram of a light source device provided by an embodiment of the present application.
Figure 3:
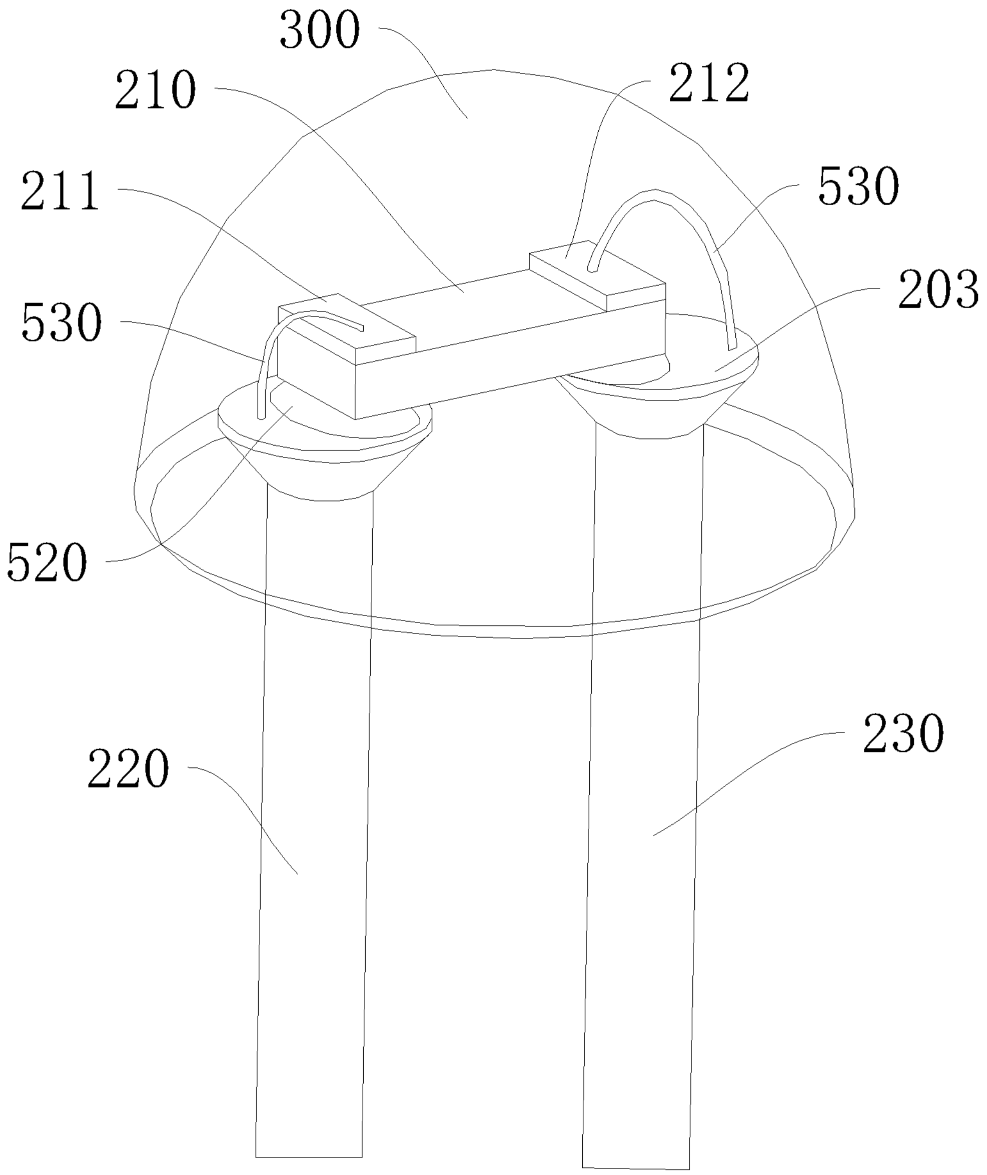
FIG. 3 is a schematic partial structural diagram of a light source device provided by an embodiment of the present application.

As shown in FIGS. 2 and 3, in an embodiment of the present application, the LED module 200 includes an LED chip 210, a first conducting pillar 220 and a second conducting pillar 230, and the first conducting pillar 220 and second conducting pillar 230 are arranged at intervals. The LED chip 210 is electrically connected with the first conducting pillar 220 and the second conducting pillar 230. The first conducting pillar 220 and/or the second conducting pillar 230 include a connecting part 201 and a conducting part 202, and the connecting part 201 and conducting part 202 are connected in sequence. The connecting part 201 is positioned in the transparent protective cover 100, and the conducting part 202 extends out of the transparent protective cover 100 to connect with external circuits. An end of the connecting part 201 away from the conducting part 202 is provided with a stage 203. The LED chip 210 is bonded on the stage 203. The LED chip 210 is adhered to the stage 203 by an insulating adhesive 520 or a conductive adhesive 510.

As shown in FIG. 2, when the conductive adhesive 510 is adopted, the input electrode 211 of the LED chip 210 is adhered to the first conducting pillar 220, and the output electrode 212 is adhered to the second conducting pillar 230. As shown in FIG. 3, when the insulating adhesive 520 is adopted, the LED chip 210 has an input electrode 211 and an output electrode 212, and the input electrode 211 is electrically connected with the first conducting pillar 220 through a wire 530; the output electrode 212 is electrically connected with second conducting pillar 230 through the wire 530.

In an embodiment of the present application, the light source device further includes a sealing plug 400, which is used for blocking and sealing the opening of the transparent protective cover 100; the first conducting pillar 220 and the second conducting pillar 230 are embedded in and pass through the sealing plug 400. Sealing plug 400 is formed by high-temperature sintering molding at the open end of transparent protective cover 100. On the one hand, the sealing plug 400 seals the accommodating cavity 110, which improves the service life of light source device. On the other hand, the sealing plug 400 plays a role in fixing the first conducting pillar 220 and the second conducting pillar 230, thereby fixing the LED chip 210. This ensures that the LED chip 210 emits stable light to provide a stable decorative effect.

The present application also provides a light string, which includes a plurality of light source devices as provided by the above embodiments, which has all the effects of the light source device. The plurality of light source devices are arranged in series or in parallel, or in series and parallel.

The above embodiments are only used to illustrate the technical solutions of this application, but not to limit it. Although the application has been described in detail with reference to the aforementioned embodiments, those of ordinary skill in the art should understand that the technical solutions described in the aforementioned embodiments may still be modified, or some of the technical features may be equivalently replaced. However, these modifications or substitutions do not make the essence of the technical solutions deviate from the spirit and scope of the technical solutions of each embodiment of this application, and shall be included in the protection scope of this application.

What is claimed is:

1. A light source device, comprising a transparent protective cover, an LED module and a refraction lens, wherein the transparent protective cover has an accommodating cavity with an opening at one end: the LED module is arranged in the accommodating cavity, and is used for emitting light: the refraction lens is covered above the LED module, a side of the refraction lens close to the LED module is an incident surface, and a side of the refraction lens away from the LED module is an exit surface, and the exit surface is used for refracting light passing through the exit surface;

the LED module comprises an LED chip, a first conducting pillar and a second conducting pillar, the first conducting pillar and the second conducting pillar are arranged at intervals; and the LED chip is electrically connected with the first conducting pillar and the second conducting pillar;

both the first conducting pillar and the second conducting pillar comprise a connecting part and a conducting part, the connecting part and the conducting part are connected in sequence; the connecting part is positioned in the transparent protective cover, and the conducting part extends out of the transparent protective cover: an end of the connecting part away from the conducting part is provided with a stage; and the LED chip is bonded on the stage;

the LED chip is provided with an input electrode and an output electrode; the LED chip is adhered to the stage by an insulating adhesive, and the input electrode is electrically connected with the first conducting pillar by a wire; and the output electrode is electrically connected with the second conducting pillar by the wire; and the LED chip is provided with an input electrode and an output electrode; the input electrode is adhered to the stage of the first conducting pillar by a conductive adhesive, and the output electrode is adhered to the stage of the second conducting pillar by the conductive adhesive.

2. The light source device of claim 1, wherein, the exit surface consists of at least one cambered surface; or the exit surface consists of at least one cambered surface and at least one plane connected in sequence.

3. The light source device of claim 1, wherein, the light source device further comprises a sealing plug for sealing and blocking the opening of the transparent protective cover; and the first conducting pillar and the second conducting pillar are embedded in and pass through the sealing plug.

4. The light source device of claim 3, wherein, the sealing plug is formed by high-temperature sintering molding at the opening end of the transparent protective cover.

5. A light string, comprising a plurality of light source devices of claim 1, and the plurality of light source devices are arranged in series or in parallel.

* * * * *